US009213789B2

(12) United States Patent
Lien et al.

(10) Patent No.: US 9,213,789 B2
(45) Date of Patent: Dec. 15, 2015

(54) METHOD OF GENERATING OPTIMIZED MEMORY INSTANCES USING A MEMORY COMPILER

(71) Applicant: M31 Technology Corporation, Hsinchu County (TW)

(72) Inventors: Nan-Chun Lien, Taipei (TW);
Hsiao-Ping Lin, Hsinchu County (TW);
Wei-Chiang Shih, Taipei (TW);
Yu-Chun Lin, Hsinchu (TW); Yu-Wei Yeh, Hsinchu (TW)

(73) Assignee: M31 TECHNOLOGY CORPORATION, Hsinchu County (TW)

( * ) Notice: Subject to any disclaimer, the term of this patent is extended or adjusted under 35 U.S.C. 154(b) by 233 days.

(21) Appl. No.: 13/713,584

(22) Filed: Dec. 13, 2012

(65) Prior Publication Data

US 2014/0173241 A1   Jun. 19, 2014

(51) Int. Cl.
*G06F 17/50* (2006.01)

(52) U.S. Cl.
CPC ........ *G06F 17/5045* (2013.01); *G06F 2217/08* (2013.01)

(58) Field of Classification Search
None
See application file for complete search history.

(56) References Cited

U.S. PATENT DOCUMENTS

| | | | | | |
|---|---|---|---|---|---|
| 4,868,770 | A | * | 9/1989 | Smith et al. | 703/14 |
| 6,324,678 | B1 | * | 11/2001 | Dangelo et al. | 716/103 |
| 6,496,972 | B1 | * | 12/2002 | Segal | 716/103 |
| 7,076,415 | B1 | * | 7/2006 | Demler et al. | 703/14 |
| 7,516,423 | B2 | * | 4/2009 | De Smedt et al. | 716/132 |
| 7,996,344 | B1 | * | 8/2011 | Goel | 706/13 |
| 8,037,430 | B2 | * | 10/2011 | Papanikolaou et al. | 716/56 |
| 2005/0060500 | A1 | * | 3/2005 | Luo et al. | 711/147 |
| 2012/0017184 | A1 | * | 1/2012 | Tsukamoto et al. | 716/55 |

OTHER PUBLICATIONS

Fisher et al. "Optimization of Standard Cell Libraries for Low Power, High Speed, or Minimal Area Designs." IEEE. Integrated Circuits Conference. Published in 1996.*
Madetoja et al. "Visualizing Multi-Dimensional Pareto-Optimal Fronts with a 3D Virtual Reality System". IEEE. Proceedings of the International Multiconference on Computer Science and Information Technology pp. 907-913. Published in 2008. <https://fedcsis.org/proceedings/2008/pliks/90.pdf>.*

* cited by examiner

*Primary Examiner* — Charles Rones
*Assistant Examiner* — Hewy Li
(74) *Attorney, Agent, or Firm* — McClure, Qualey & Rodack, LLP

(57) ABSTRACT

A method of generating optimized memory instances using a memory compiler is disclosed. Data pertinent to describing a memory to be designed are provided, and front-end models and back-end models are made to supply a library. Design criteria are received via a user interface. Design of the memory is optimized among speed, power and area according to the provided library and the received design criteria, thereby generating memory instances.

16 Claims, 4 Drawing Sheets

METHOD OF GENERATING OPTIMIZED MEMORY INSTANCES USING A MEMORY COMPILER

BACKGROUND OF THE INVENTION

1. Field of the Invention

The present invention generally relates to a memory compiler, and more particularly to a memory compiler that takes into consideration of the speed, power and area with automatic optimization.

2. Description of Related Art

A memory compiler, such as a RAM (random-access memory) compiler, may be adapted to generate memory components or instances in an automatic manner. The memory compiler may be developed to preferably support system-on-chip (SoC) design capabilities. Conventional memory compilers, however, consider only one factor (for example, speed, power or density) to generate memory instances. As a result, the generated memory instances are mostly not optimized to client's requirements.

Moreover, in generating the memory instances, the conventional memory compilers operate in a device-level manner. As a result, it is very time-consuming to optimize the memory instances.

For these reasons, the conventional memory compilers could not effectively and rapidly generate the optimized memory instances. A need has thus arisen to propose a novel memory compiler to overcome the disadvantages of the conventional memory compilers.

SUMMARY OF THE INVENTION

In view of the foregoing, it is an object of the embodiment of the present invention to provide a method of generating memory instances using a memory compiler that optimizes the design of a memory among speed, power and area. In one embodiment, the disclosed memory compiler performs in architecture-level, block-level, and device-level manners to accelerate the generation of the memory instances.

According to one embodiment, data pertinent to describing a memory to be designed are provided, and front-end models and back-end models are made to supply a library. Design criteria are received via a user interface. Design of the memory is optimized among speed, power and area according to the provided library and the received design criteria, thereby generating memory instances.

In one specific embodiment, the step of optimization uses a top-down approach, by which the memory is decomposed into a plurality of building blocks; at least one high-speed library, at least one low-power library and at least one small-area (high-density) library are retrieved from the provided library for the decomposed blocks; and parameters of devices of the blocks are modified. The step of optimization also uses a bottom-up approach, by which the modified devices are linked to form the blocks; and the formed blocks are assembled to result in the memory.

DETAILED DESCRIPTION OF THE INVENTION

Figure 1:
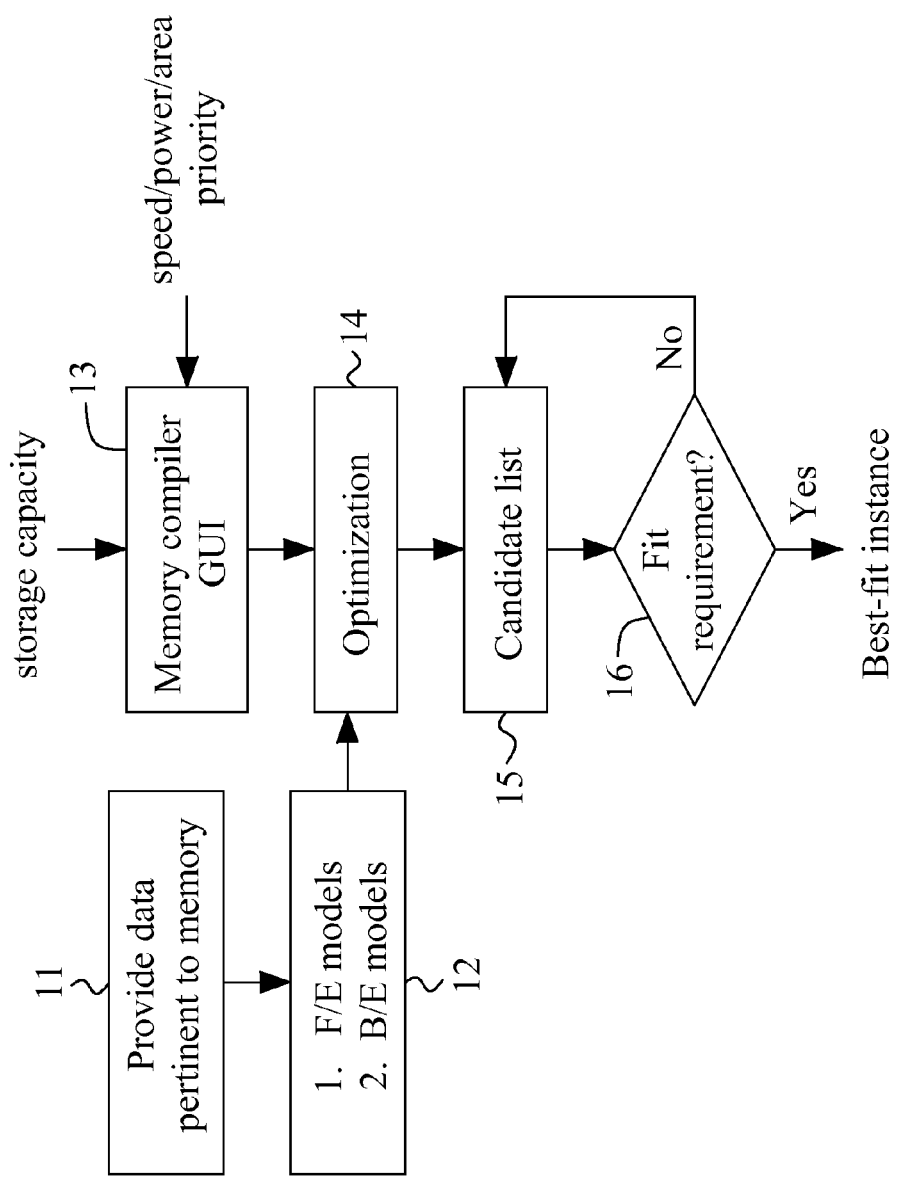
FIG. 1 shows a flow diagram illustrating a method of generating optimized memory instances using a memory compiler according to one embodiment of the present invention.

FIG. 1 shows a flow diagram illustrating a method of generating optimized memory instances using a memory compiler according to one embodiment of the present invention. The embodiment may be adapted to generate optimized memory instances such as a static random-access memory (SRAM), a read-only memory (ROM), a dynamic random-access memory (DRAM), a content addressable memory (CAM), or a FLASH memory.

Specifically, in step 11, data pertinent to describing a memory to be designed are first provided, for example, by a semiconductor foundry. Exemplary data provided in step 11 may be, but is not limited to, circuits modeled, for example, by SPICE (Simulation Program with Integrated Circuit Emphasis), a design rule (e.g., topological layout rule (TLR)) or a cell type (e.g., SRAM cell). Based on the provided data, front-end (F/E) models and back-end (B/E) models are made, in step 12, to supply a library, with design behavior models, to an optimizer (to be described in details later), that optimizes the design of the memory among speed, power and area (or density). In contrast, the conventional memory compiler is designed by considering only one factor with speed, power or area, but not all of the three factors. In the specification, the front-end models refer to electricity (e.g., current, voltage or power) associated with the memory to be designed, and the back-end models refer to layout patterns associated with the memory to be designed. In a preferred embodiment, the disclosed method is preferably adapted to designing small-area (high-density) memories. The preferred embodiment is capable of designing optimized small-area (or high-density) memory instances in a way being more effective than conventional methods.

In step 13, on the other hand, a user interface, preferably a graphical user interface (GUI), installed in a computer with the memory compiler is utilized to receive design criteria from a client such as instance configuration. Specifically, the user interface receives, among others, priority ranking among speed, power and area. Moreover, the user interface may also receive storage capacity (e.g., 2 MB or 1 GB) of the memory to be designed. In the following steps, the memory is then designed and optimized according to, among other things, the received storage capacity and the priority ranking.

Subsequently, in step 14, optimizing the design of the memory among speed, power and area is made primarily according to the library provided in step 12 and the constraints received in step 13. The details about the optimization will be described later in connection with FIG. 2.

After performing the optimization in step 14, a candidate list composed of a number of generated memory instances is prepared, in step 15, for assessment according to client's requirement. In the end of step 16, one of the generated memory instances may be selected from the candidate list to best-fit into client's requirement.

Figure 2:
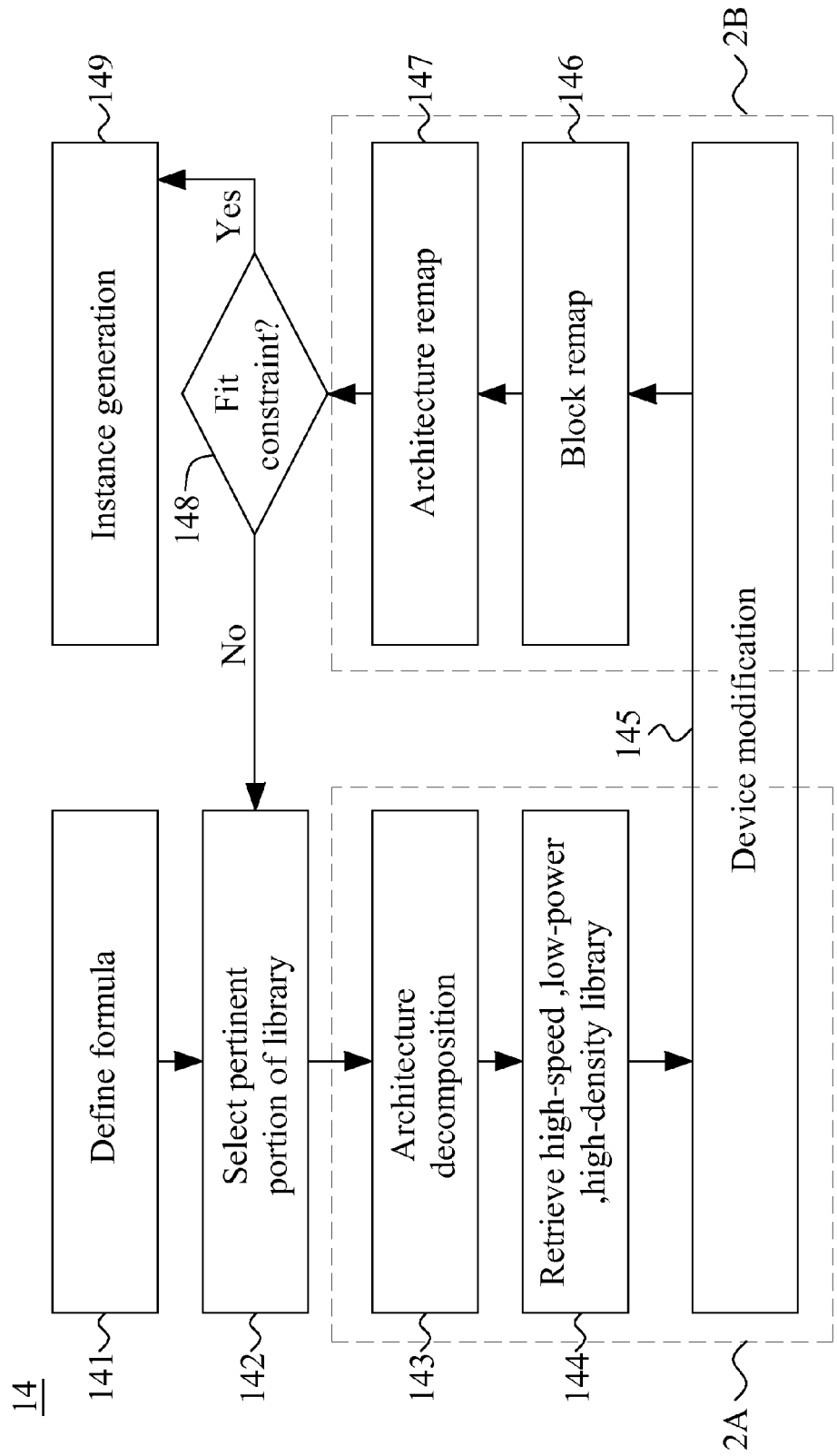
FIG. 2 shows a detailed flow diagram illustrating the optimization step in FIG. 1.

FIG. 2 shows a detailed flow diagram illustrating the optimization (i.e., step 14) performed in FIG. 1. Specifically, in step 141, rules (or formulae) govern power, speed and area of the memory to be designed are formulated according to, at least, the constraints received in step 13. At the same time, in step 142, a pertinent portion of the provided library is also selected according to, at least, the constraints received in step 13.

Figure 3:
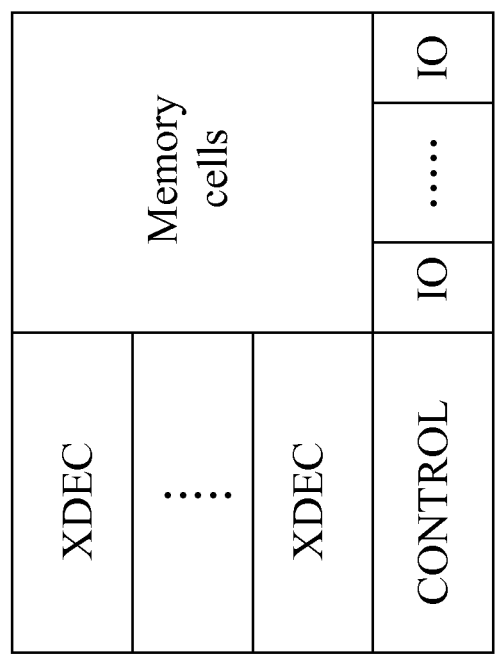
FIG. 3 exemplifies block decomposition.

According to one aspect of the embodiment, a top-down approach 2A is adopted in optimizing the design of the memory. Specifically, in step 143, as exemplified in FIG. 3, optimizing the entire memory to be designed is decomposed into certain building blocks: memory cells, X-decoders (XDEC), a control circuit (CONTROL) and Input/Output circuits (IO). As a result, the architecture of the memory may be expressed in a block level. In contrast, as the conventional memory compiler performs in a device level, it is more difficult to manipulate the design of the memory in the conventional memory compiler than the embodiment. The block of the embodiment may be, but not necessarily, a leaf-cell-based block.

Afterwards, in step 144, at least one high-speed library, at least one low-power library and at least one small-area (high-density) library for the blocks are retrieved from the library that is previously provided from step 12. In the embodiment, the modifier "high" or "low/small" refers a physical quantity, such as speed, area or power, that has a value greater than or less than a predetermined threshold, respectively. Finally, in step 145, parameters of devices, such as transistors, of the blocks are modified when necessary. In the embodiment, the parameters to be modified may include threshold voltages (e.g., low threshold voltage, regular threshold voltage or high threshold voltage), width/length of PMOS (p-type metal-oxide-semiconductor) or NMOS (n-type metal-oxide-semiconductor) transistors, parallel/series devices of physical layout pattern, and dynamic/static combination/sequential circuit style.

According to another aspect of the embodiment, a bottom-up approach 2B is adopted to fine-tune the optimization. Specifically, in step 146, the modified devices (wherein, for example, some may have been modified and the other have not) are linked together (or remapped) to form respective blocks, and thereafter, in step 147, the blocks are then assembled (or remapped) to form the memory, which is then subjected to simulation. If the simulated result complies with the constraints (step 148), an associated memory instance is thus generated (step 149); otherwise, another portion of the provided library is selected, in step 142, according to, at least, the priority ranking received in step 13, and the top-down approach 2A and the bottom-up approach 2B are performed again. As a result, the top-down approach 2A and the bottom-up approach 2B may be performed one or more times in order to obtain the candidate list that is composed of a number of generated memory instances.

Figure 4:
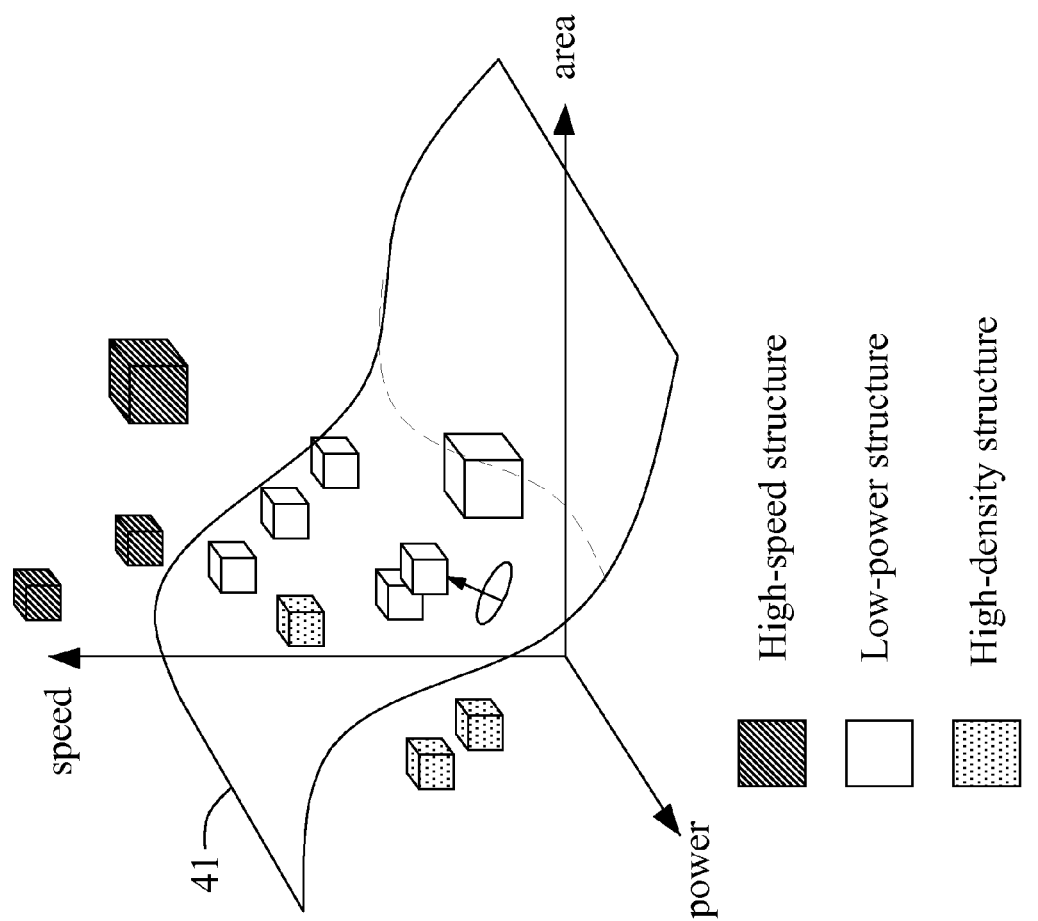
FIG. 4 shows an exemplary three-dimensional (3D) constraint surface.

As mentioned above, the embodiment optimizes the design of the memory among all the speed, power and area. Accordingly, as exemplified in FIG. 4, a three-dimensional (3D) constraint surface 41 is constructed during the optimization. One or more memory instances that are close to the 3D constraint surface 41 may be selected as preferred candidates.

Although specific embodiments have been illustrated and described, it will be appreciated by those skilled in the art that various modifications may be made without departing from the scope of the present invention, which is intended to be limited solely by the appended claims.

What is claimed is:

1. A method of generating optimized memory instances using a memory compiler, the method comprising:
   providing data pertinent to describing a memory to be designed;
   making front-end models and back-end models to supply a library;
   receiving design criteria via a user interface; and
   optimizing design of the memory among speed, power and area according to the provided library and the received design criteria, thereby generating memory instances;
   wherein the design criteria comprise priority ranking among speed, power and area;
   wherein the step of optimization comprises:
      formulating rules that govern speed, power, and area of the memory to be designed according to the priority ranking and specification requirement;
      selecting a pertinent portion of the provided library according to the priority ranking and specification requirement;
      decomposing the memory to be designed into a plurality of building blocks;
      retrieving at least one high-speed library, at least one low-power library and at least one small-area library from the provided library for the decomposed blocks;
      modifying parameters of devices of the blocks;
      assembling the formed blocks to result in the memory; and
      subjecting the assembled memory to simulation.

2. The method of claim 1, further comprising:
   preparing a candidate list composed of a plurality of the generated memory instances for assessment; and
   selecting one of the generated memory instances from the candidate list.

3. The method of claim 1, wherein the data pertinent to describing the memory include modeled circuits, a design rule or a cell type.

4. The method of claim 1, wherein the front-end models concern electricity associated with the memory to be designed.

5. The method of claim 1, wherein the back-end models concern layout patterns associated with the memory to be designed.

6. The method of claim 1, further comprising receiving storage capacity of the memory to be designed.

7. The method of claim 1, wherein the decomposed building blocks comprise memory cells, X-decoders, a control circuit and I/O circuits.

8. The method of claim 1, wherein the parameters to be modified comprise threshold voltages, width/length of PMOS or NMOS transistors, parallel/series devices, or dynamic/static gate devices.

9. The method of claim 1, wherein the step of optimization generates a three-dimensional (3D) constraint surface, wherein one or more memory instances are selected as a preferred candidate.

10. A three-dimensional (3D) memory compiler optimization method, comprising:
   formulating rules governing three dimensions composed of power, speed and area of a memory to be designed according to priority ranking among the three dimensions, thereby generating a 3D constraint surface;
   decomposing the memory to be designed into a plurality of building blocks;
   retrieving at least one high-speed library, at least one low-power library and at least one small-area library from a provided library for the decomposed blocks;
   modifying parameters of devices of the blocks;
   linking the modified devices to form the blocks;
   assembling the formed blocks to result in the memory, thereby generating a plurality of memory instances; and
   selecting one or more said memory instances as a preferred candidate.

11. The method of claim 10, wherein the decomposed building blocks comprise memory cells, X-decoders, a control circuit and I/O circuits.

12. The method of claim 10, wherein the parameters to be modified comprise threshold voltages, width/length of PMOS or NMOS transistors, parallel/series devices, or dynamic/static gate devices.

13. A memory compiler optimization method, comprising:
- formulating rules that govern power, speed and area of a memory to be designed according to priority ranking;
- selecting a pertinent portion of a provided library according to the priority ranking;
- performing a top-down process on the to-be-designed memory by breaking down an architecture of the memory into blocks, which are further broken down into devices;
- performing a bottom-up process on the devices by piecing together of the devices into blocks, which are further pieced together into an architecture of the memory; and
- subjecting the pieced memory to simulation;
- wherein the top-down process comprises:
  - decomposing the memory to be designed into a plurality of building blocks;
  - retrieving at least one high-speed library, at least one low-power library and at least one small-area library from the provided library for the decomposed blocks; and
  - modifying parameters of devices of the blocks.

14. The method of claim 13, wherein the bottom-up process comprises: linking the modified devices to form the blocks; and assembling the formed blocks to result in the memory.

15. The method of claim 13, wherein the decomposed building blocks comprise memory cells, X-decoders, a control circuit and I/O circuits.

16. The method of claim 13, wherein the parameters to be modified comprise threshold voltages, width/length of PMOS or NMOS transistors, parallel/series devices, or dynamic/static gate devices.

* * * * *